Jan. 27, 1959

P. O. DAHLMAN 2,871,418

AUTOMATIC TELEPHONE SYSTEM

Filed March 9, 1955

2 Sheets-Sheet 1

INVENTOR.
PER O. DAHLMAN

BY

Brown, Jackson, Boettcher & Dienner

ATTYS.

INVENTOR.
PER O. DAHLMAN
BY
Brown, Jackson, Boettcher & Dienner
ATTYS.

United States Patent Office 2,871,418 Patented Jan. 27, 1959

2,871,418

AUTOMATIC TELEPHONE SYSTEM

Per O. Dahlman, Galion, Ohio, assignor to North Electric Company, a corporation of Ohio Application March 9, 1955, Serial No. 493,076

5 Claims. (Cl. 317—140)

Figures 1, 3:
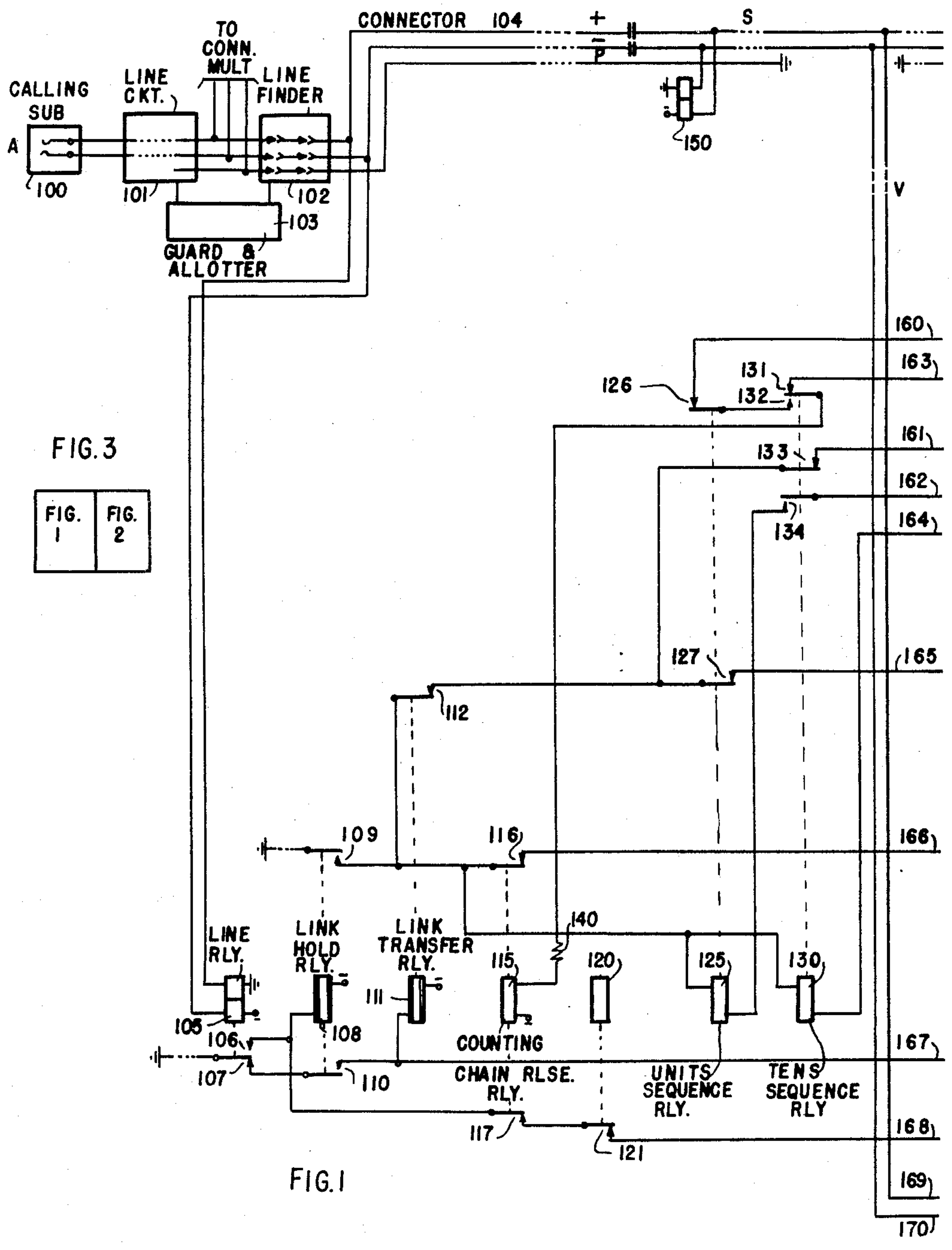

The present application relates to automatic telephone systems, and more particularly to an automatic telephone system having a novel called party line selection system included therein.

In certain conventional automatic telephone systems, there are incorporated connector switches which contain a group of "tens" relays for selecting a group of ten lines out of one hundred lines, and a group of "units" relays for selecting a single line out of the ten line group selected by the "tens" relay group. In similar fashion, certain ones of these automatic telephone systems include selector switches which contain group selection relays for each "level" of the selector switches which are utilized to select a group of trunks or links accessed through the levels, and a second group of relays for selecting a specific trunk or link in the selected level.

Conventionally, each counting chain relay in the connector or selector contains contacts for accomplishing group selection, and other contacts for accomplishing selection of a single line from the group. Alternattively, a single set of contacts in each counting chain relay may be used, and a relay common to all counting chain contacts shifts the selection from "group" relays to the "units" relays for selection of a specific line.

In the provision of a reliable automatic telephone system of the all relay type, it is essential that the relay equipment and the contacts associated therewith be utilized in a manner compatible with the operating characteristics of the relay and its contacts, and further that the individual relays of a system be assigned a minimum of circuit controlling operations. Obviously, a system wherein some relays which carry a large number of contacts are marked with each seizure of the switch and other relays are operated only on required occasions must result in uneven relay and contact wear. In such event it is essential from the standpoint of practicality to achieve a more uniform sharing of the load by the respective components.

One specific example of such condition has long existed in all relay switches wherein counting chains operable in response to the receipt of several successive digits to select corresponding ones of associated relay sets. In such arrangement, the counting chain must include separate contact sets for each set of relays which are accessible thereto. It is apparent, therefore, that each counting chain relay must carry a heavy contact load and further, that in the selection of any one relay from any one set, many of the contacts are needlessly operated. Such arrangement imposes a heavy burden on the counting chain relays, and of course, results in useless contact wear.

As a solution to this problem, the present invention eliminates one set of contacts from the counting chain relays and utilizes instead in a marking operation, one of the associated groups of relays which is normally only operated on intermittent occasions. The contacts of the relay group thus utilized are marked by the counting chain responsive to the dialing of a first digit to select one relay of a second relay group and are thereafter operated responsive to receipt of a second digit in its conventional manner. As a result the contact wear and relay loading is substantially reduced. Thus, the present invention basically comprises a novel selection system which exhibits a more economical approach to the problem of line selection.

In the exemplary embodiments set forth in the disclosure, the counting chain operates responsive to the receipt of the first digit to "mark" the units relays in the accomplishment of the selection of the desired tens relay, and then operates in response to the second digit to select the desired units relay. In accomplishing the novel line selection afforded by the present invention, certain extra contacts are utilized on the "units" relays for group selection and a single set of contacts for each counting chain relay is utilized for both group and units selection. In this manner the special relay conventionally employed for switching the selected leads is also eliminated.

It is an object of the present invention to provide a new and novel automatic telephone system in which a reduced number of components are used in the selection of a single line out of a plurality of lines.

It is another object of the present invention to provide a novel called party selection system in which a particular "group" relay may be operated over the contacts of a marked one of a first set of relays to select a group of lines including the desired line, and in which the first set of relays is utilized to select the desired line from the plurality of lines selected by the operated one of the "group" relays.

Figure 2:
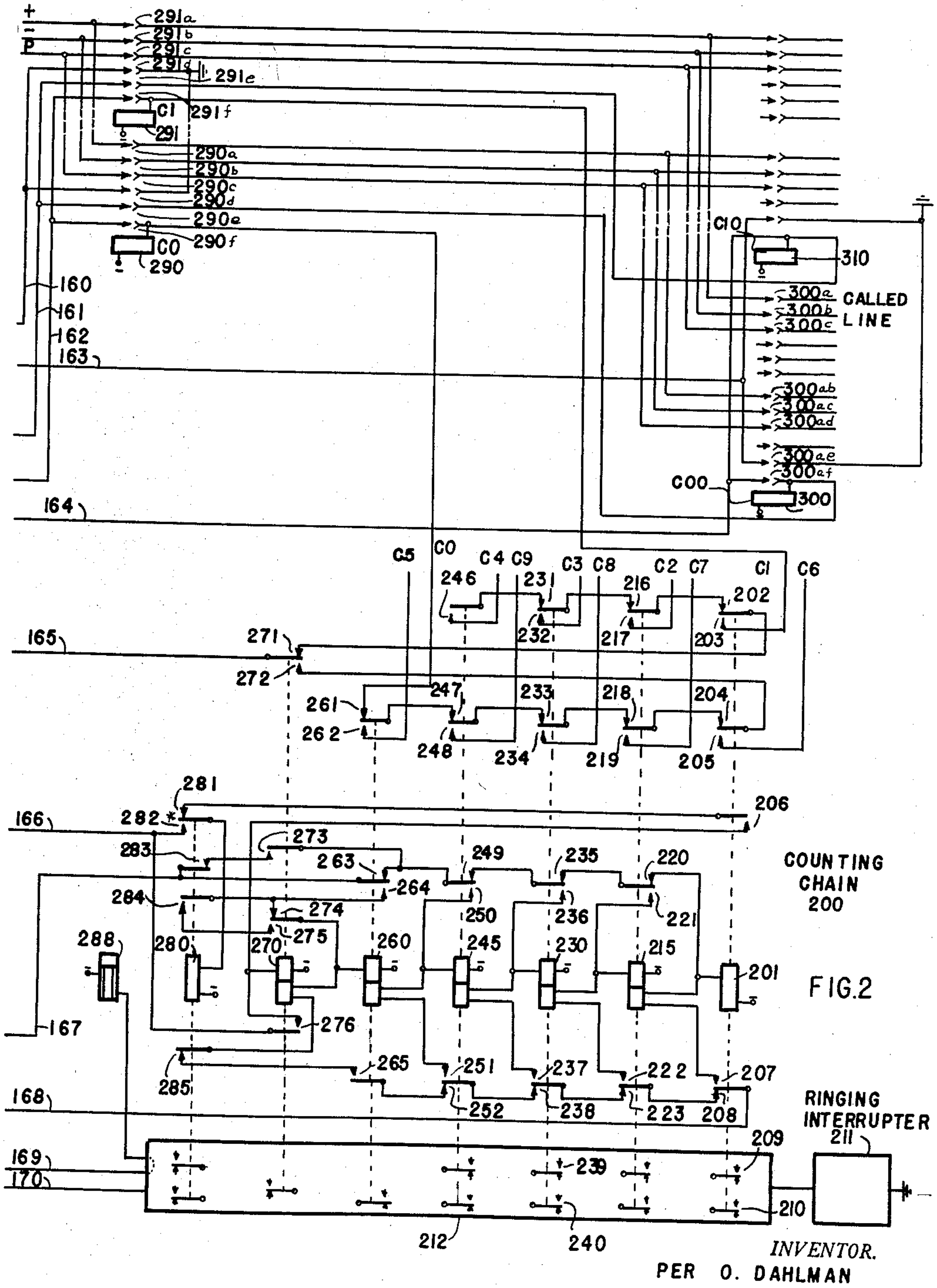

These and other advantages and features of the novel automatic telephone system will become apparent with reference to the following specification, claims and drawings in which:

Figures 1 and 2 illustrate in schematic form the novel party line selection means of the present invention, certain conventional equipment being therein shown in block form; and Figure 3 illustrates in block form the arrangement of Figures 1 and 2.

GENERAL OPERATION

In accordance with the illustrated embodiment of the present invention, as shown in Figures 1 and 2, a particular called line may be selected through the cooperative action of "units" and "tens" groups of relays under the control of a single counting chain. In the following explanation it shall be assumed that the particular called party line may be selected through the dialing of two digits (a "units" and a "tens" digit).

Briefly the counting chain relays are operative in response to the dialing of a particular "tens" digit to prepare an operating path for the one of the ten "units" relays corresponding to the digit dialed. Upon the selection of the proper "units" relay, and its operation, a "tens" relay is selected from a group of ten "tens" relays corresponding to the particular "units" relay selected. Upon the operation of the selected "tens" relay, the counting chain is released through the operation of a counting chain release relay, so that it may respond to the dialing of the "units" digit which follows the dialing of the "tens" digit. The release of the counting chain in response to the operation of the selected "tens" relay also results in the release of the "units" relay utilized in the selection of the particular "tens" relay.

Upon the release of the "units" relay a "tens" sequence relay is operated which in turn releases the counting chain release relay to prepare the counting chain for the reception of the "units" digit. In response to the dialing of the "units" digit, the counting chain selects a "units" relay corresponding to the dialed digit, and upon its operation the "units" relay operates the counting chain release relay to release the counting chain. Upon the release of the counting chain, a "units" sequence relay is operated which results again in the release of the counting chain release relay. This latter relay prepares the counting chain for the reception of a "ring" digit following which the counting chain is rendered insensitive to further dialing, and the call is extended from the calling subscriber to the called subscriber through the contacts of the selected "units" and "tens" relays.

Interrupted ringing current for energization of the ringer of the called subscriber is applied over the extended line. When the called subscriber lifts his receiver in response to the ringing of his line, the low impedance loop resulting through his subset operates a ring trip relay which in turn effects the operation of a cut through relay which operates in the conventional manner to connect the talking leads of the calling subscriber lines over the contacts of the operated "units" and "tens" relays to the called subcriber.

DETAILED OPERATION

For a more complete understanding of the line selection arrangement of the present invention, reference is made to Figures 1 and 2 and the following explanation of the extension of a call from a calling subscriber to a called subscriber. In particular, a calling subscriber, such as that shown at A (Figure 1), lifts his receiver preparatory to placing a call to a subscriber with whom he desires to communicate. Upon the removal of the receiver, the line contacts of subset 100 are closed for actuating line circuit 101 associated with the line of the calling party which through the instrumentality of guard and allotter circuits 103 seizes an idle line-finder-connector link, such as the link 102, 104 illustrated schematically in Figures 1 and 2.

After the seizure of an idle line-finder-connector link the guard and allotter circuits 103 are released and dial tone is sent over the line to indicate to the calling subscriber that the connector is prepared for the reception of dialing digits.

With seizure of connector 104, pulsing relay 105 is operated over the contacts of subset 100 and over the following path: battery, through the lower winding of pulsing relay 105, over the contacts of line finder 102, over line circuit 101, the contacts of subset 100, line finder 101, over the contacts of line finder 102, and thence to ground through the upper winding of pulsing relay 105.

Pulsing relay 105 operates, and at its contacts 106 completes an energizing path for link hold relay 108 over an obvious circuit, and at its contacts 107 interrupts a point in the holding circuit for certain relays of counting chain 200. Link hold relay 108 is slow to release and remains energized during the transmission of dialing impulses.

Link hold relay 108 operates, and at its contacts 110 prepares an operating circuit for link transfer relay 111, and an operating circuit for the first relay of counting chain 200, and at its contacts 109 prepares a holding circuit for the "tens" relay selected from the group of relays enumerated 300—310, corresponding to the "tens" digit dialed, in accordance with the discussion to follow. Link hold relay 108 at its contacts 109 also prepares an operating circuit for the selected "units" relay of relays 291—290 in accordance with either the "tens" or "units" digit dialed by the calling subscriber and further prepares a holding circuit for counting chain transfer relay 270 and holding relay 280 of counting chain 200.

Assuming now that the calling party dials the directory number of the called party, which in this specific example shall be assumed to be "01," pulsing relay 105 pulses ten times as the tens digit "0" is received from the subset 100. Upon the receipt of the first break of the first impulse, line relay 105 restores, and at its contacts 107 prepares an energizing circuit for link transfer relay 111 over the following path: battery, through the winding of relay 111, over contacts 110, 107 and thence to ground. Relay 111 is a relay having a slow-to-release characteristic such that it takes more time to restore than link hold relay 108, and is held operated until after receipt of the last impulse of the dialed digit. Line relay 105 at its contacts 107 also completes an operating circuit for the first counting chain relay 201.

Link transfer relay 111 operates and at its contacts 112 interrupts the operating circuit for the "units" and "tens" relays. This operating circuit is held open so that the "units" and "tens" relays do not individually operate in response to the individual impulses of the dialed digit. Because of the slow release characteristics of relay 111, the operating circuits for the "units" and "tens" relays are held open until after the last pulse of the dialed digit has been registered in counting chain 200. A short interval later, link transfer relay 111 releases and completes the operating circuit for the "units" or "tens" relay corresponding to the dialed digit.

As noted above, line relay 105 pulses in response to the receipt of the open and closed portions of the pulses transmitted by the dialing contacts of subset 100. During the open period of the first pulse, pulsing relay 105 restores, and at its contacts 107 completes the energizing path for relay 201 of counting chain 200 over the path extending from battery, through the winding of relay 201, over contacts 220, 235, 249, 263, conductor 167, and contacts 110, 107, and thence to ground.

Relay 201 operates, and at its contacts 202, 204, interrupts a point in the operating circuit for "units" relays C2–C5, C7–C0, at its contacts 203 prepares an operating circuit for "units" relay 291 (C1), and at its contacts 205 prepares an operating circuit for "units" relay C6 (not shown).

Relay 201 at its contacts 207, prepares its own holding circuit in series with second counting chain relay 215, and at its contacts 208 interrupts a point in the operating circuit for the higher numbered counting chain relays 230, 245, 260, and 270.

First counting chain relay 201 at its contacts 209 and 210 (shown in block 212 associated with ringer interrupter circuit 211) prepares for the application of ringing current to the conductors of the call extending circuit to energize the ringer of the called subscriber. However, since the ringing current is not applied to the called subscriber's line until after the dialing of a ring digit following the dialing of the called subscriber's directory number, the effect of the operation of the contacts of the counting chain relays illustrated in block 212 will not be considered in detail until after the extension of the call through the "units" and "tens" relay contacts.

It will be recalled that because of its slow-to-release characteristics link transfer relay 111 is held operated, and at its contacts 112 presently interrupts the prepared circuits for the "units" and "tens" relays.

With receipt of the first make period after the first break period, line relay 105 reoperates, and at its contacts 106 completes the operating circuit for the second counting chain relay 215 over the path extending from battery, through the winding of first counting chain relay 201, through the lower winding of second counting chain relay 215, over contacts 207, conductor 168, contacts 121, 117, 106 and thence to ground.

Line relay 105 at its contacts 107 interrupts the original operating path for first counting chain relay 201, which however is held operated through the above described series circuit.

Second counting chain relay 215 operates, and at its contacts 216 opens the operating circuit for "units" relays C4 and C3 (not shown); at its contacts 217 prepares an operating circuit for the second "units" relay C2 (not shown); at its contacts 218 interrrupts the operating circuit for "units" relays C5, C9 and C8 (not shown); and at its contacts 219 prepares an operating circuit for "units" relay C7 (not shown).

Second counting chain relay 215 at its contacts 220 opens the original operating circuit for first counting chain relay 201; at its contacts 221 prepares a self holding circuit; at its contacts 222 prepares an operating circuit for the third counting chain relay 230 in series with the upper winding of second counting chain relay 215; and at its contacts 223 interrupts the operating paths for the counting chain relays of a higher order than the third.

Upon receipt of the open period of the second pulse, line relay 105 restores, and at its contacts 107 completes the holding circuit for the second counting chain relay 215 over the path extending from battery, through the upper winding of relay 215, over contacts 221, 235, 249, 263, conductor 167, contacts 110, and 107 to ground, and at its contacts 106, interrupts the holding circuit for first counting chain relay 201.

Relay 201 restores and at its upper contacts 202 prepares an operating circuit for "units" relays C2–C4 (not shown) which circuit is held open at contacts 112; at its contacts 203 and 205 further interrupts the operating circuits for "units" relays C1 and C6; at its upper contacts 204 prepares an operating circuit for "units" relays C5, C9, C8, and C7 (not shown) which circuit is held open at contacts 112.

First counting chain relay 201 at its contacts 207 interrupts the original operating circuit for second counting chain relay 215 which, however, is held operated over the above described holding circuit, and at its contacts 208 prepares an operating circuit for the third counting chain relay 230.

Line relay 105 reoperates at the end of the open period of the second pulse, and at its contacts 106 completes the energizing path for the third counting chain relay 230, which extends from battery over the series windings of relays 215 and 230, over contacts 222, 208, conductor 168, contacts 121, 117, and 106, and thence to ground.

The third counting chain relay 230 operates, and at its upper contacts 231 interrupts an operating circuit for "units" relay C4; at its contacts 232 prepares an operating circuit for "units" relay C3 (not shown); at its contacts 233, further interrupts the operating circuits for "units" relays C0 and C9 (not shown); at its upper contacts 234 prepares an operating circuit for "units" relays C8 (not shown).

Third counting chain relay 230 at its contacts 236, prepares a self holding circuit; at its contacts 235, interrupts the holding circuit for the second counting chain relay 215; at its lower contacts 237 prepares an operating path for the fourth counting chain relay 245 in series with the third counting chain relay 230.

Upon receipt of the open period of the third pulse, line relay 105 restores and at its contacts 106 interrupts the series energizing circuit for the second and third counting chain relays 215 and 230, and at its contacts 107 completes the holding circuit for the third counting chain relay 230.

Second counting chain relay 215 restores and at its contacts 216 and 218 prepares operating circuits for "units" relays C3, C4, C8, C9 and C0; at its contacts 217 and 219 further opens the operating circuits for "units" relays C2 and C7; at its contacts 221 further interrupts its own holding circuit; at its contacts 222 interrupts the original operating circuit for third counting chain relay 230; and at its contacts 223, prepares an operating circuit for the fourth counting chain relay 245.

At the end of the open period of the third pulse, link relay 105 reoperates and at its contacts 106 completes the energizing circuit for the fourth counting chain relay 245, which extends from battery, through the series combination of the winding of relays 230 and 245 over contacts 237, 223, 208, conductor 168, contacts 121, 117 and 106 to ground.

Relay 245 operates, and at its upper contacts 246 prepares an operating circuit for "units" relay C4 (not shown); at its contacts 247 further interrupts the operating path for "units" relay 290 (C0); at its contacts 248 prepares an operating path for "units" relay C9; at its contacts 249 interrupts the holding circuit for the third counting chain relay 230, and at its contacts 250 prepares its own holding circuit; at its lower contacts 251 prepares an operating circuit for the fifth counting chain relay 260. Fourth counting chain relay 245 at its lower contacts 252 interrupts an operating circuit for counting chain transfer relay 270.

On the open period of the fourth pulse, line relay 105 restores and at its contacts 106 interrupts the operating circuit for the third counting chain relay 230 which restores, and at its contacts 107 completes the holding circuit for the fourth counting chain relay 245 which extends from battery, over the upper winding of relay 245, contacts 250, 263, conductor 167, contacts 110 and 107, and thence to ground.

Third counting chain relay 230 restores and at its contacts 238 prepares an operating circuit for fifth counting chain relay 260; at its contacts 231 and 233 prepares the operating paths for "units" relays C4 and C9; at its contacts 232 and 234 interrupts operating paths for "units" relays C3 and C8 respectively; at its contacts 235, prepares an operating path of first counting chain relay 201; at its contacts 236, further interrupts its own holding circuit; at its contacts 237 interrupts the original energizing circuit for fourth counting chain relay 245.

At the end of the open period of the fourth pulse line relay 105 at its contacts 106 completes the energizing path for the fifth counting chain relay 260.

The fifth counting chain relay 260 operates and at its upper contacts 261 interrupts the operating circuit for "units" relay C0; at its upper contacts 262 prepares an operating circuit for "units" relay C5 (not shown); at its upper contacts 263 interrupts the holding circuit for the fourth counting chain relay which however is held operated in series with the fifth counting chain relay 260; at its contacts 264 prepares its own holding circuit; and at its contacts 265 prepares an operating circuit for transfer relay 270.

On the open period of the fifth pulse, line relay 105 restores and at its contacts 106 interrupts the energizing circuit for the fourth and fifth counting chain relays 245 and 260, and at its contacts 107 completes a holding circuit for fifth counting chain relay 260 which extends from battery, over the winding of relay 260, over contacts 274, 264, conductor 167, contacts 110 and 107 to ground.

Fourth counting chain relay 245 restores and at its contacts 246 prepares a point in the operating circuit for "units" relay C4 (not shown); at its contacts 247 prepares a point in the operating circuit for "units" relay C5; at its contacts 248 further interrupts the operating circuits for "units" relay C9; at its contacts 250 further interrupts its holding circuit and at its contacts 251, interrupts the original energizing circuit for the fifth counting chain relay 260.

Line relay 105 operates at the end of the open period of the fifth pulse and at its contacts 106 completes an energizing circuit for transfer relay 270 in series with the winding of fifth counting chain relay 260 which extends from battery, over the upper winding of relay 260, the lower winding of relay 270, over contacts 285, 265, 252, 238, 223, 208, conductor 168, contacts 121, 117, and 106 to ground.

Transfer relay 270 operates and at its upper contacts 272, prepares a point in the operating circuits for "units" relays C6–C0; at its contacts 271 further interrupts the operating circuits for "units" relays C1–C5; at its contacts 274 interrupts the holding circuit for the fifth counting chain relay 260; at its contacts 276 locks to ground over a path extending from battery, over the winding of relay 270, contacts 276, conductor 166, contacts 116 and 109 and thence to ground.

On receipt of the open period of the sixth pulse, line relay 105 is restored, and at its contacts 106 interrupts the series energizing circuit for the fifth counting chain relay 260 and transfer relay 270, and at its contacts 107 completes an operating circuit for the first counting chain relay 201 which extends from battery over the winding of relay 201, and over contacts 220, 235, 249, 273, 283, conductor 167, contacts 110 and 107 to ground. Transfer relay 270 is held energized over the above identified locking circuit.

Fifth counting chain relay 260 restores and at its upper contacts 261 prepares a point in the operating circuit for "units" relay C0; at its upper contacts 262, further interrupts the operating circuit for a fifth "units" relay C5; at its contacts 263 prepares an alternative operating path for first counting chain relay 201; at its contacts 264 interrupts the original holding circuit for transfer relay 270; and at its lower contact 265 interrupts the original operating circuit for transfer relay 270.

It will be remembered that the first counting chain relay 201 was energized prior to the release of relay 260. First counting chain relay 201 operates and at its contacts 206 is effective to complete an energizing circuit for relay 280 which extends from negative battery, over the winding of relay 280, over the make-before-break contacts 281, contacts 206, 276, conductor 166, contacts 116, and 109 to ground.

First counting chain relay 201 at its contacts 202 and 204 is also effective to further interrupt energizing circuits for "units" relays C2–C5 and C7–C0; at its contacts 203 and 205 prepares points in the operating paths for "units" relays C1 and C6; at its contacts 207 prepares an operating circuit for second counting chain relay 215; and at its contacts 208 further interrupts operating paths for the higher numbered counting chain relays.

Relay 280 operates and at its make-before-break contacts 282 prepares a self holding circuit extending from battery, through the winding of relay 280, contacts 282, conductor 166, contacts 116 and 109 to ground; at its contacts 281 opens its original energizing circuit; at its contacts 283 interrupts the original energizing circuit for the first counting chain relay 201, which however is held energized over the previously described alternative path, and at its contacts 285 interrupts the original operating circuit of transfer relay 270, which however is held energized over the previously described locking circuit.

As line relay 105 reoperates with receipt of the make period of the sixth pulse, it is effective at its contacts 106 to complete an energizing path for the second counting chain relay 215 which extends from battery, over the series windings of relays 201 and 215, over contacts 207, conductor 168, contacts 121, 117 and 106 to ground. Line relay 105 at its contacts 107 interrupts the holding circuit for first counting chain relay 201 which, however, is held energized over the series circuit through the lower winding of second counting chain relay 215.

Second counting chain relay 215 operates and at its contacts 216 and 218 interrupts the operating circuits for the following "units" relays; C3, C4, C8, C9 and C0; at its contacts 217 and 219 prepares operating circuits for "units" relays C2 and C7 (not shown); at its contacts 220 further interrupts the original energizing circuit for the first counting chain relay 201; at its contacts 221 prepares its own holding circuit; at its contacts 222 prepares the series energizing circuit for the third counting chain relay 230; and at its contacts 223 interrupts the operating circuits for those counting chain relays of higher order than the third.

From the previous analysis the manner in which the energizing circuits for the third, fourth and fifth counting chain relays 230, 245, and 260 respectively are prepared in response to the operation of line relay 105 which is controlled by the open and closed periods of the succeeding pulses will be apparent to those skilled in the art. It is also apparent that the energizing circuits for the "units" relays C8, C9 and C0 are completed in a manner similar to that described with reference to the "units" relays C1–C7.

Upon the cessation of the pulses corresponding to any predetermined dialed digit, line relay 105 is held operated and at its contacts 107 is effective to interrupt the energizing circuit for link transfer relay 111. Link transfer relay 111 releases after a period of time determined by its slow-to-release characteristics and at its contacts 112 completes an operating circuit for the specific "units" relay whose operating path is completed through the contacts of the counting chain relay operated in conjunction with the number of pulses corresponding to the dialed digit.

In the specific example chosen, the first digit dialed was "0" and in accordance with the above discussion, relays 270, 280 and 108 are held operated. As a result an energizing circuit for "units" relay 290 (C0) is completed over the path extending from battery, over the winding of relay 290, contacts 261, 247, 233, 218, 204, 272, conductor 165, contacts 127, 112 and 109 to ground.

The following chart illustrates the condition of the counting chain in response to the dialing of each digit. The relays therein shown remain operated at the end of the open period of each digit.

*Chart I*

| Digit | Period of Digit | Relays |
|---|---|---|
| 1 | open | 108*—111*—201 |
| | closed | 201—215 |
| 2 | open | 215 |
| | closed | 215—230 |
| 3 | open | 230 |
| | closed | 230—245 |
| 4 | open | 245 |
| | closed | 245—260 |
| 5 | open | 260 |
| | closed | 260—270 |
| 6 | open | 270—280—201 |
| | closed | 270—280—201—215 |
| 7 | open | 270—280—215 |
| | closed | 270—280—215—230 |
| 8 | open | 270—280—230 |
| | closed | 270—280—230—245 |
| 9 | open | 270—280—245 |
| | closed | 270—280—245—260 |
| 0 | open | 270—280—260 |
| | closed | 270—280—108 |

*Because of their slow-to-release characteristics relays 108 and 111 are held operative throughout the remainder of the dialing period and for this reason, will not be repeated throughout the rest of the chart. For any preselected digit, at the end of the dialing period, link hold relay 108 remains operated and link transfer relay 111 releases after a period of time determined by its slow-to-release characteristics for completion of an energizing path for the "units" relay corresponding to the dialed digit.

The following chart illustrates the operating paths for the "units" relay associated with the particular digit, and in addition illustrates the particular relays operated to provide the energizing path.

*Chart II*

| Digit | Units Relay | Counting Chain Relays Operated | Energizing Circuit Paths to "Units" Relay |
|---|---|---|---|
| 1 | C1 (291) | 201—215 | battery, through the winding of relay C1 (291), over contacts 203, 271, C165, 127, 112, and 109 to ground. |
| 2 | C2 | 215—230 | battery, through the winding of relay C2, over contacts 217, 202, 271, C165, 127, 112 and 109 to ground. |
| 3 | C3 | 230—245 | battery, through the winding of relay C3, over contacts 232, 216, 202, 271, C165, 127, 112, 109 and thence to ground. |
| 4 | C4 | 245—260 | battery, through the winding of relay C4, over contacts 246, 231, 216, 202, 271, C165, 127, 112, and 109 to ground. |
| 5 | C5 | 260—270 | battery, through the winding of relay C5, over contacts 262, 247, 233, 218, 204, 272, C165, 127, 112, and 109 to ground. |
| 6 | C6 | 201—215—270—280 | battery, through the winding of relay C6, over contacts 205, 272, C165, 127, 112, and 109 to ground. |
| 7 | C7 | 215—230—270—280 | battery, through the winding of relay C7, over contacts 219, 204, 272, C165, 127, 112, and 109 to ground. |
| 8 | C8 | 230—245—270—230 | battery, through the winding of relay C8, over contacts 234, 218, 204, 272, C165, 127, 112, and 109 to ground. |
| 9 | C9 | 245—260—270—280 | battery, through the winding of relay C9, over contacts 248, 233, 218, 204, 272, C165, 127, 112, and 109 to ground. |
| 0 | C0 (290) | 270—280 | battery, through the winding of relay C0, over contacts 261, 247, 233, 218, 204, 272, C165, 127, 112, and 109 to ground. |

Continuing with the discussion of the specific example, it will be remembered that the "tens" digit was assumed to be "0," and the "units" relay C0 (290) has been energized in response to the dialing thereof.

"Units" relay 290 operates, and at its contacts 290*a*, 290*b*, and 290*c*, extends the talking and test wire leads of the calling subscriber to the tens relays. However, it is noted that these leads are interrupted at an earlier point in the connection and are accordingly not cut through to the "tens" relays at this time.

Relay 290 at its contacts 290*d*, prepares a circuit for the operation of counting chain release relay 115, and at its contacts 290*e*, prepares an operating circuit for "tens" relay 300 (C00) over the path extending from battery, over the winding of relay 300, contacts 290*e*, conductor 161, contacts 133, 112, and contacts 109 to ground; and at its contacts 290*f*, prepares a point in the operating circuit for the "units" sequence relay 125.

The tenth "tens" relay 300 operates, and at its contacts 300*a*, 300*b*, 300*c*, prepares for the extension of the talking and test leads of the calling party to the called line; at its contacts 300*ae*, prepares an energizing circuit for the counting chain release relay 115 over the path extending from battery, over the windings of relay 115, resistance 140, contacts 131 conductor 163, contacts 300*ae* and thence to ground, and at its contacts 300*af*, prepares an operating circuit for the tens sequence relay 130 which extends from battery, over the winding of relay 300, contacts 300*af*, conductor 164, the winding of the tens sequence relay 130, and over contacts 109 to ground. The tens sequence relay 130 does not operate immediately since the energizing circuit for tens sequence relay 130 is shunted by the original energizing circuit for tens relay 300. It is apparent, however, that upon the release of "units" relay 290, the ground which is extended over contacts 290*ae* to tens relay 300 is removed and the above described series path for the tens sequence relay 130 and tens relay 300 is effective.

Counting chain release relay 115 operates and at its contacts 116 interrupts the holding circuit for relays 270 and 280 (if operated) and at its contacts 117 restores the operated ones of the counting chain relays (relays 270 and 280 in the present example).

Counting chain transfer relay 270 restores and at its contacts 272 interrupts the energizing circuit for the operated one of the "units" relays (relay 290 in the present example). Relay 290 restores and at its contacts 290*e* interrupts the original energizing circuit for the "tens" relay 300, whereby the series circuit for tens relay 300 and tens sequence relay 130 is rendered effective.

"Units" relay 290 at its contacts 290*a*, 290*b* and 290*c*, interrupts the conductor circuits extending to the tens relay 300, and at its contacts 290*d* interrupts the energizing circuit for the counting chain release relay 115.

Counting chain release relay 115 restores, and at its contacts 117 prepares the energizing circuit for the counting chain 200 which, as previously explained, has been restored to normal following registration of the "tens" digit. The counting chain 200 is now prepared for the receipt of the pulses which represent the "units" digit.

Release relay 115 at its contacts 116 reprepares the holding circuits for relays 270 and 280 of counting chain 200.

Tens sequence relay 130 operates; and at its contacts 131 interrupts the energizing circuit for the counting chain release relay 115; at its contacts 132, prepares an operating circuit for the counting chain release relay 115 to operate upon the closure of the contacts of the "units" relay corresponding to the next digit dialed; at its contacts 133 interrupts the energizing circuit for the "tens" relay set to prevent operation of another "tens" relay as the desired units relay is selected; and at its contacts 134, prepares a circuit for the opeartion of the "units" sequence relay 125.

Selection has now been made of ten lines out of the one hundred lines which are accessible to the ten "tens" relays 300–310, and only those subscriber lines having a "tens" digit of "0" have been made accessible to the contacts of the "units" relays 290–291 for selection purposes.

DIALING OF UNITS DIGIT

It will be recalled that the relays of the counting chain 200 have been released in preparation for re-energization in response to the pulses of the "units" digit as dialed by the subscriber.

As the calling party now dials the units digit, which in this case is assumed to be "1," the line relay 105 operates to complete circuits to connect control relays 108 and 111 and the counting chain in the manner described with respect to the dialing of the "tens" digit. Reference may be made to Chart I which shows the sequential operation of the relays of the counting chain in response to the dialing of any given digit.

From Chart I it may be determined that at the end of the open period of the first pulse, the second counting chain relay 215 operates in series with relay 201, and that relay 111, after an appropriate interval corresponding to its delay characteristics, releases.

Upon its release, link transfer relay 111, at its contacts 112 completes an energizing circuit for the first "units" relay 291 (C1) over a path extending from battery, over the winding of relay 291, contacts 203, 271, conductor 165, contacts 127, 112, and 109 to ground.

Relay 291 operates and at its contacts 291*a*, 291*b* and 291*c*, prepares a circuit for effecting the extension of the talking and test leads of the calling subscriber line to the contacts of the selected one of the "tens" relay 300.

Relay 291 at its contacts 291*d*, completes an energizing circuit for counting chain release relay 115 over a path extending from negative battery, over the winding of relay 115, over resistance 140, contacts 132, 126, conductor 160, and contacts 291*d* to ground; at its contacts 291*f*, prepares an operating circuit for the "units" sequence relay 125 and a holding circuit for "units" relay 291 which extends from battery, over the winding of relay 291, conductor 162, contacts 134, the winding of relay 125, and contacts 109 to ground. However, the series energizing circuit described is shunted by the original energizing circuit for the units sequence relay 125 and sequence relay 125 is not operated at this time.

Counting chain release relay 115 operates, and at its contacts 117 opens the holding circuit for the first and second counting chain relays 201 and 215 which release. First counting chain relay 201 at its contacts 203, interrupts the original operating circuit for units relay 291, to render the previously shunted series circuit for sequence relay 125 and units relay 291 effective.

Units sequence relay 125 operates, and at its contacts 127 interrupts the energizing circuits for "units" and "tens" relays 290–291 and 300–310 and prevents any further operation of these relays in response to subsequent dialing impulses received, and at its contacts 126 interrupts the operating circuit for counting chain release relay 115, which releases and at its contacts 117 reprepares the energizing circuit for counting chain 200.

Selection has now been made of the desired one of the group of ten lines selected by tens relays 300–310, and a connection has been extended by the connector to the called subscriber's line.

DIALING OF THE RING DIGIT

In that the operating path for the "units" relays is held open by contacts 127 of the units sequence relay 125, further operation of the counting chain 200 and the operation of the upper contacts of the relays therein contained will be effected without accomplishing further operation of the tens and units relays of the system.

The lower contacts of the relays of counting chain 200, shown in block 212, are utilized in the application of ringing current to the talking leads of the circuit between the calling and called subscriber. In response to the dialing of the ring digit, which in this case may be assumed to be "3," line relay 105 pulses three times and the third and fourth counting chain relays 230 and 245 are energized in the above described manner. Upon the cessation of the pulses representing the ring digit, link transfer relay 111 restores in the conventional manner and over a circuit (not shown) energizes the second counting chain release relay 120, which at its contacts 121 interrupts the operating circuit to the counting chain 200 to prevent any undue operation of the counting chain in response to further dialing. The second counting chain release relay 120 further completes conventional pickup circuits (not shown) for the ringing interrupter 211.

When pickup has occurred, contacts indicated as "V" are closed in the conventional manner and prepare points in the ringing circuit to extend ringing current from the ringing interrupter over the contacts of the operated units and tens relays to the substation of the called subscriber.

Specifically, the third counting chain relay 230 operates and at its contacts 239 and 240 closes an energizing path for the ringing current which extends from ground over ringing interrupter 211, contacts 240, conductor 170, contacts "V," over the positive conductor of the talking circuit, over contacts 291*a*, 300*a*, and through the called substation and ringer, over contacts 300*b*, 291*b* over the negative lead of the talking circuit, contacts "V," conductor 169, contacts 239 and through the winding of ring trip relay 288 to battery.

Ringing current is applied to the ringer of the called party in the conventional manner to inform him of the call.

ANSWERING BY CALLED PARTY

When the called party answers, the low resistance loop through his substation operates ring trip relay 288 which controls the ringing current termination in a well known manner.

Contacts shown schematically at S then operate to connect "backbridge" relay 150 to the calling line, which operates to in turn extend the talking circuit at contacts (not shown) from the line of the calling subscriber to the called subscriber line.

RELEASE OF CALL

The release of the connection is under the control of the calling party. When the called party hangs up, relay 150 releases and the talking circuit between the calling and called subscriber lines is interrupted.

When the calling party hangs up, line relay 105 releases, which, in turn, at its contacts 106, releases link hold relay 108.

Link hold relay 108 restores and at its contacts 109 opens the circuit to ground which had held operated the selected ones of the "units" and "tens" relays. These relays release and restore the selector equipment to its normal unoperated condition.

The calling line finder 102 and connector 104 are released in a well known manner to restore the equipment. All of the relays of connector 104 are released, and the switch is now prepared for use in the establishment of a further call.

CONCLUSION

There has been set forth hereinbefore a novel automatic telephone system which is extremely simple in operation, and which has proven to be economical in application. A particular group of relays selects one of a second group of relays, and then is reused to select a particular line associated with the plurality of lines selected by the first selected group of relays. Furthermore, the unique circuit of the present invention eliminates a number of components utilized in conventional systems whereby the improved selection arrangement is actually provided at a savings in cost.

These and other features of the invention which are believed to be new are set forth in the accompanying claims.

What is claimed is:

1. In a selector switch for use in an automatic telephone system, a first group of relays, a second group of relays, and signal responsive means including a counting chain operative responsive to each set of first and second sets of incoming signals to operate a corresponding one of said first relay group, means controlled by the operated one of said first relay group to select a corresponding one of said second relay group, means for controlling operation of the selected relay of the second group only with receipt of the first impulse set and release means operative responsive to the operation of said relay of said second group to release said signal responsive means and the operated relay of said first group, and circuit transfer means operative in response to the release of said operated relay of said first group to prevent the operation of further relays of said second relay group with the subsequent operation of the relays of said first group.

2. In an automatic switch for use in an automatic telephone system, a first group of relays, a second group of relays, means including a counting chain operative responsive to receipt of each set of first and second sets of incoming signals to operate a corresponding one of said first group of relays, said counting chain being adapted for counting a maximum predetermined number of incoming impulses and containing a number of counting elements less that said maximum predetermined number, means controlled by the operated one of said first relay group to mark a corresponding one of said second group of relays for operation, and means operative responsive only with receipt of the first set of incoming signals to operate the marked one of said second group of relays.

3. In a selector switch for use in an automatic telephone system, a first group of relays, a second group of relays, means including counting chain means operative responsive in a consecutive manner to the receipt of each set of first and second sets of incoming signals to operate a corresponding one of said first group of relays, means controlled by the operated one of said first relay group to select a corresponding one of said second relay group, and means operative responsive only to receipt of the first set of incoming signals to operate the selected one of the second relay group.

4. In a selector switch for use in an automatic telephone system, a first group of relays, a second group of relays, means including counting chain means operative responsive to receipt of each set of first and second sets of incoming signals, contact means controlled by said counting chain means to operate a corresponding one of said first group of relays, means controlled by the operated one of said first relay group to mark a corresponding one of said second relay group, means operative responsive only with receipt of the first set of incoming signals to operate the marked one of said second relay group, release means controlled by the operated one of said second group of relays to effect restoration of the operated one of the first group of relays, a first sequence means operated responsive to the release of said operated one of said first group of relays to restore said release means, to prepare said counting chain means for reoperation, and to render the relays of said second group inoperative with further operation for the relays of the first group, and a second sequence means controlled by the one said first group of relays operated with receipt of the second signal set to restore said counting chain to its original condition in preparation for the receipt of further signal sets, and to render the said contact means ineffective after receipt of said second signal set.

5. In a selector switch for use in an automatic telephone system, a first group of relays, a second group of relays, means including counting chain means operative responsive to receipt of each set of first, second, and third sets of incoming signals, contact means controlled by said counting chain means to operate a corresponding one of said first group of relays, means controlled by the operated one of said first relay group to mark a corresponding one of said second relay group, means operative responsive only with receipt of the first set of incoming signals to operate the marked one of said second relay group, release means controlled by the operated one of said second group of relays to effect restoration of the operated one of the first group of relays, a first sequence means operated responsive to the release of said operated one of said first group of relays to restore said release means, to prepare said counting chain means for reoperation, and to render the relays of said second group inoperative with further operation for the relays of the first group, a second sequence means controlled by the one of said first group of relays operated with receipt of the second signal set to restore said counting chain to its original condition in preparation for the receipt of further signal sets, and to render the said contact means ineffective after receipt of said second signal set, and a second contact means controlled by said counting chain means in response to receipt of said third set of incoming digits.

References Cited in the file of this patent

UNITED STATES PATENTS

| | | |
|---|---|---|
| 2,375,413 | Guenther | May 8, 1945 |
| 2,568,101 | Voss | Sept. 18, 1951 |
| 2,705,743 | Klinkhammer | Apr. 5, 1955 |